(12) United States Patent
Benson et al.

(10) Patent No.: US 11,279,902 B2
(45) Date of Patent: Mar. 22, 2022

(54) HYPERPROTONATION CLEANING, DISINFECTION, AND STERILIZATION COMPOSITIONS AND METHODS

(71) Applicant: ASCALON INTERNATIONAL, INC., Reston, VA (US)

(72) Inventors: Keith Benson, Reston, VA (US); Michael George Mulcahy, Potomac Falls, VA (US)

(73) Assignee: ASCALON INTERNATIONAL INC., Reston, VA (US)

( * ) Notice: Subject to any disclaimer, the term of this patent is extended or adjusted under 35 U.S.C. 154(b) by 0 days.

(21) Appl. No.: 15/220,806

(22) Filed: Jul. 27, 2016

(65) Prior Publication Data
US 2017/0027169 A1 Feb. 2, 2017

Related U.S. Application Data

(60) Provisional application No. 62/198,429, filed on Jul. 29, 2015.

(51) Int. Cl.
*C11D 3/48* (2006.01)
*A01N 37/36* (2006.01)

(52) U.S. Cl.
CPC ............... *C11D 3/48* (2013.01); *A01N 37/36* (2013.01)

(58) Field of Classification Search
USPC ........................................................ 514/552
See application file for complete search history.

(56) References Cited

U.S. PATENT DOCUMENTS

| 2013/0150451 A1* | 6/2013 | Salamone | A01N 47/44 514/635 |
| 2014/0275267 A1* | 9/2014 | Beug-Deeb | A01N 37/36 514/574 |

* cited by examiner

*Primary Examiner* — Kathrien A Cruz
(74) *Attorney, Agent, or Firm* — Birch, Stewart, Kolasch & Birch, LLP

(57) ABSTRACT

This invention relates to compositions and methods for cleaning, disinfection, and sterilization of hard, soft, and porous surfaces, equipment, human skin, tissues, food and vegetable surfaces, and other media which are contaminated with microorganisms such as bacteria, viruses, yeast, and molds. Particularly relevant is the microbial environment whereby bacterial communities can generate three-dimensional polymicrobial Extracellular Polymeric Substances, or EPS, biofilm communities supported by an aggregation of microorganisms growing on a substrate layer, substantially degrading the antimicrobial performance of typical cleaners, disinfectants, and sterilizers. There is great need for a composition that will reliably eradicate microorganisms across a broad spectrum, particularly polymicrobial EPS communities shrouded by self-generated biofilm layer. Such a composition is disclosed herein. The invention discloses new compositions, and methods for formulation of compositions, of weak acids, surfactants, and glycol monoesters, which achieve a level of eradication such that when tested following application, no surviving microorganisms remain. All compositions and methods disclosed herein have the further benefit of their ingredients being classified by the US Food and Drug Administration (FDA) as GRAS, or Generally Regarded As Safe for use on food and food contact surfaces; and the embodiment of the claimed invention herein contains 95% USDA Certified Biobased content, and is accepted to the USDA BioPreferred® Program.

1 Claim, 4 Drawing Sheets

Hyperprotonation – pH Balance and Kill Zone

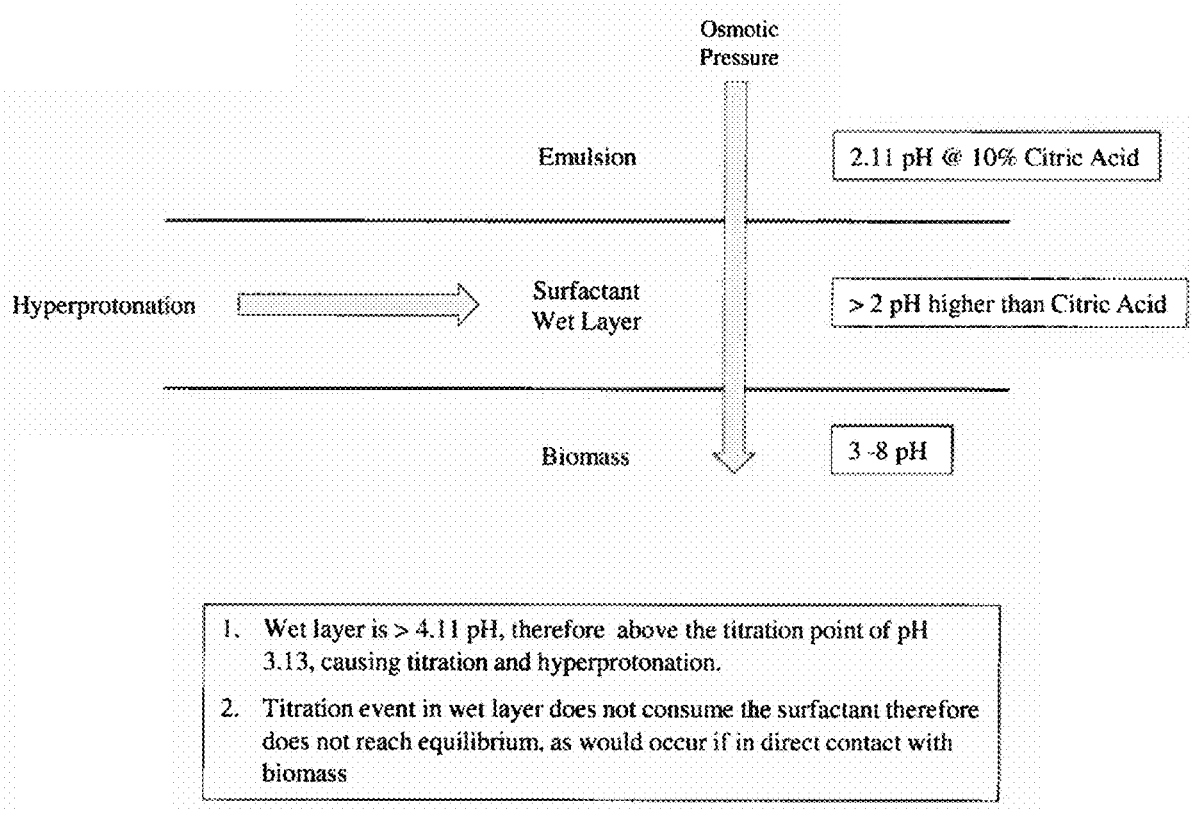

Figure 3

Antimicrobial Performance

| Organism | Assay Conditions | Assay Number | Assay Validity | Positive Cultures at 8 min | Positive Cultures at 18 min |
|---|---|---|---|---|---|
| E. coli | Clean | 1 | Valid | 0 | 0 |
| | | 2 | Valid | 0 | 0 |
| | | 3 | Valid | 0 | 0 |
| | | 4 | Valid | 0 | 0 |
| | Dirty | 1 | Valid | 0 | 0 |
| | | 2 | Invalid | 0 | 0 |
| | | 3 | Valid | 0 | 0 |
| | | 4 | Valid | 0 | 0 |
| P. aeruginosa | Clean | 1 | Valid | 0 | 0 |
| | | 2 | Invalid | 0 | 0 |
| | | 3 | Valid | 0 | 0 |
| | | 4 | Valid | 0 | 0 |
| | Dirty | 1 | Valid | 0 | 0 |
| | | 2 | Valid | 0 | 0 |
| | | 3 | Valid | 0 | 0 |
| S. aureus | Clean | 1 | Valid | 0 | 0 |
| | | 2 | Valid | 0 | 0 |
| | | 3 | Valid | 0 | 0 |
| | Dirty | 1 | Valid | 0 | 0 |
| | | 2 | Valid | 0 | 0 |
| | | 3 | Valid | 0 | 0 |
| P. vulgaris | Clean | 1 | Valid | 0 | 0 |
| | | 2 | Valid | 0 | 0 |
| | | 3 | Valid | 0 | 0 |
| | Dirty | 1 | Invalid | 0 | 0 |
| | | 2 | Valid | 0 | 0 |
| | | 3 | Valid | 0 | 0 |
| | | 4 | Valid | 0 | 0 |

Extract from "Laurinex – Performance in the TGA Disinfectant Test, South Australian Health & Medical Research Institute (SAHMRI), dated November 19, 2014; TGA stands for the Government of Australia Therapeutic Goods Administration.

Figure 4

Listeria monocytogenes Antimicrobial Performance

| Organism | Assay Condition | Assay Number | Assay Validity | Positive Cultures at 8 min | Positive Cultures at 18 min |
|---|---|---|---|---|---|
| *L. monocytogenes* | Clean | 1 – 09/02/15 | Valid | 0/5 | 0/5 |
| | | 2 – 10/02/15 | Valid | 0/5 | 0/5 |
| | | 3 – 11/02/15 | Valid | 0/5 | 0/5 |
| | Dirty | 1 – 02/03/15 | Valid | 2/5 | 0/5 |
| | | 2 – 04/03/15 | Valid | 1/5 | 0/5 |
| | | 3 – 05/03/15 | Valid | 1/5 | 0/5 |

Extract from "Laurinex – Performance Against Listeria monocytogenes using the TGA Disinfectant Test Protocol, South Australian Health & Medical Research Institute (SAHMRI), dated March 11, 2015; TGA stands for the Government of Australia Therapeutic Goods Administration.

HYPERPROTONATION CLEANING, DISINFECTION, AND STERILIZATION COMPOSITIONS AND METHODS

CROSS REFERENCE TO RELATED APPLICATION

This application claims the benefit of U.S. Provisional Application No. 62/198,429 filed on Jul. 29, 2015, which is incorporated herein by reference in its entirety.

FIELD OF THE INVENTION

This invention relates to compositions and methods for cleaning, disinfection, and sterilization of hard and soft surfaces, equipment, human skin, tissues, and other media which are contaminated with microorganisms such as bacteria, viruses, yeast and molds. There is great need for a composition that will reliably eradicate microorganisms across a broad spectrum. Such a composition is disclosed herein. The invention discloses new compositions, and methods for formulation of compositions, of weak acids, surfactants, and glycol monoesters, which achieve a level of eradication such that when tested following application, no surviving microorganisms remain.

BACKGROUND

It is generally understood that cleaning and disinfecting compositions for hard and soft surfaces, equipment, and human skin and tissues do not achieve complete eradication of microbe colonies. Common cleaning and disinfecting compositions based on active ingredients such as hydrogen peroxide (e.g. Lysol) and sodium hypochlorite (e.g. Clorox) are publicly marketed as "killing 99.9% of viruses and bacteria" when applied. However, those claims are based on results of laboratory planktonic testing procedures in which the composition is applied directly to microorganisms in suspension.

Extensive research has shown that the planktonic testing environment used for assessing the efficacy of common cleaners and disinfectants does not accurately represent results in the actual environments in which microorganisms thrive. In the real world, microorganisms such as *Pseudomonas aeruginosa, Bacillus anthracis, Escherichia coli, Staphylococcus aureus, Proteus vulgaris,* and *Listeria monocytogenes* typically colonize within physical matrices known as biofilms. The microbial cells in the biofilm produce a matrix outside the microorganisms known as an "extracellular polymeric substance" (EPS), more generally referred to as "biofilms."

The presence of EPS is known to reduce the efficacy of cleaning, disinfecting and sterilizing compositions. EPS creates physical and chemical defenses that protect the microorganisms within the matrix, resulting in substantial survival rates and regrowth. When commonly used cleaning and disinfecting compositions are applied, portions of microbial colonies that are protected by the EPS then reproduce rapidly after application. Thus, it is typical with respect to a disinfectant advertised as "killing 99.9% of viruses and bacteria" (based on applications in solution using planktonic testing), that in the real world applications where EPS is prevalent, they will kill much lower percentages, and colonies will regrow rapidly. Laboratory tests have shown products claiming "99.9%" to actually kill substantially less than 30% in the presence of biofilm, refer to Corcoran, M., et al., Dec. 20, 2013.

Moreover, real world contamination often includes combinations of different types of microorganisms within biofilm-protected colonies (polymicrobial contamination). Cleaners and disinfectants currently in general use may be effective only against certain microorganisms, and not others. The commonly used tests assess effectiveness against mono-microbial test parameters, not typical polymicrobial contamination scenarios.

Thus, the commonly used claim of cleaners and disinfectants "killing 99.9%" of microorganisms is wrong and misleading in real world conditions where EPS is prevalent. Consumers who believe they are protecting themselves and their families by applying such conditions in actuality are leaving behind substantial bacterial and virus contamination, along with corresponding health threats.

Historically, the ability to compose and apply reliably effective broad-spectrum disinfectants, antiseptics, and sterilants has not been understood to be possible. For this reason, regulatory regimes have prohibited claims that cleaners or disinfectants result in "complete eradication" or "100% kill rates."

There is great need for a composition that would in fact achieve total eradication of microorganisms across a broad spectrum in real world EPS conditions. However, to date, there has been no disclosure of such a composition, nor any identification of the scientific principles and methods that would facilitate the formulation of such actually effective solutions.

Scientists and regulators are continuing to conduct research regarding the nature of biofilms and their physical and chemical characteristics. The object of this invention is disclosure of compositions and methods that are of greater efficacy in cleaning, disinfecting and sterilizing against microorganisms in real world environments. It is also the object of this invention to disclose methods of formulation of compositions that are uniquely targeted to breach microorganism defenses, including biofilms, EPS, and LPS, and achieve complete levels of eradication.

Cleaning and disinfecting compositions are in widespread use for purposes of removing grime, dirt and other contamination from surfaces. Contaminated surfaces include hard surfaces and soft surfaces such as those found in household environments, in industrial environments, surfaces of food products such as fruits, vegetables and meat, and the exterior and interior surfaces of the human body.

Hard surfaces include those which are frequently encountered in offices and houses, such as countertops, walls, doors, and surfaces found in lavatories, for example fixtures such as toilets, shower stalls, bathtubs, bidets, and sinks. Facilities such hospitals, medical centers, athletic facilities, gyms, restaurants, hospitality, lodging, conferences, and the like, can pose particularly difficult challenges. Interior and exterior surfaces of equipment also can be contaminated, including surfaces of equipment used in the food, scientific and medical industries, dental treatment, health care facilities and hospitals. Contamination also occurs on surfaces of devices that are implanted in the human body or used in medical procedures, such as catheters, prosthetic cardiac valves and intrauterine devices.

In addition, certain bacterial pathogens cause or contribute to human illnesses through contact with skin surfaces or mucosal tissue. Once in humans, pathogens colonize surfaces primarily as biofilms of organisms, i.e., as thin-films of organisms attached to host tissues through complex networks of polysaccharides, proteins, and nucleic acids. Such pathogens also colonize equipment through biofilm formation.

The role of biofilms is discussed in US Patent Application 2014/0275267 (Sep. 18, 2014), which notes that: "bacterial organisms which actively populate these common surfaces may form organized communities called biofilms. Bacterial cells forming these biofilm communities assume a biological phenotype that is markedly different than their corresponding planktonic (nonsurface attached, or free-swimming) bacterial analogs (citing W. G. Characklis, "Microbial Biofouling Control" in Biofilms, Characklis and Marshall, eds., Wiley & Sons, 1990, J. W. Costerton, Annual Review of Microbiology; 1995; 49:711-45). Biofilms are a special form of contamination that have been shown to require as much 1,000 times the dose of routine biocides in order to eradicate the microorganism contained within, as compared to planktonic forms."

Cleaners and disinfectants currently on the market are significantly ineffective in the presence of biofilms. One aspect of the problem is that biofilms have a wide range of pH. As the basis of commonly used compositions, it had been viewed that pH was homogenous across microorganism environments, around pH of 5-7. Recent studies have shown that the pH range of biofilms is broader, from as low as 3 to up to 8. In addition, biofilm pH is both variable and dynamic. In reacting to contact with certain cleaning and disinfecting compositions the pH of biofilm may change. The prior art has generally considered the problem of biofilms as a steady-state issue, assuming no variation and not testing for such variation. Thus, the industry has been focused on applying compositions without addressing the true nature of the problem. This problem creates particular challenges with respect to compositions including weak acids, which ultimately rely on the process of protonation. Dynamic pH changes in biofilm can result in equilibrium in pH at the contact layer with weak acid solutions, resulting in pH below the titration point.

Another aspect of the problem is that biofilms result in physical and chemical defenses of microorganisms that must be breached in order to disrupt the living organism within. These defenses include both the outer EPS layer of the biofilm and an inner layer of lipopolysaccharides (LPS). For example, studies have been cited suggesting that the intact LPS layer of Enterobacteriaceae protected those organisms from antibacterial compositions.

Thus, microorganisms in biofilm colonies can be considered to have two distinct defense mechanisms that may be required to be overcome: (1) the mechanism whereby the pH of the biofilm results in changing the pH at the composition contact layer bringing the pH within the titration point of the active ingredient; and (2) physical protections afforded by the EPS and LPS layers.

Current cleaners and disinfectants are not generally suited for addressing a broad spectrum range of various types of microorganisms. One problem is that there is such a variation of chemical composition and physical nature of microbes, that in order to have a broad-spectrum attack it is necessary to identify and address the lowest common denominator or common defenses. Variations include physical and chemical composition of EPS/LPS, particularly in gram-negative bacteria, which can operate to make the penetration of biocides to be ineffective. A composition seeking to be effective on a broad spectrum basis must adequately address these variations.

Examples of microorganisms that are not effectively eradicated with current cleaners and disinfectants include the following:

1. *Staphylococcus aureus* is a gram-positive bacterium that is a common cause of infections. The organism is ubiquitous, with estimates of 30-40% of humans being colonized on mucosal surfaces. Illnesses caused by the organism range from benign infections, such as furuncles, to life-threatening illnesses such as toxic shock syndrome (TSS).
2. *Bacillus anthracis* is a gram-positive rod that, through production of a cell surface capsule and other molecules and exotoxins, causes serious illnesses, including skin, gastrointestinal, and pulmonary anthrax. This organism is characterized as a "category A select agent" and considered a significant threat to human health.
3. Methicillin-resistant *Staphylococcus aureus* (MRSA) is a bacterium responsible for several difficult-to-treat infections in humans. It is also called oxacillin-resistant *Staphylococcus aureus* (ORSA). MRSA is any strain of *Staphylococcus aureus* that has developed, through the process of natural selection, resistance to beta-lactam antibiotics, which include the penicillins (methicillin, dicloxacillin, nafcillin, oxacillin, etc.) and the cephalosporins.

Other examples are described in the references listed below that are incorporated by reference herein.

A primary chemical interaction which can result in the breakdown of biofilms, LPS, and microorganisms, is protonation. Protonation is a fundamental chemical reaction and is a step in many stoichiometric and catalytic processes. Protonation and deprotonation occur in most acid-base reactions and are the core of most acid-base reaction theories.

For a given compound, protonation occurs at the point when the active molecule will donate the relevant proton, which is called the titration point. For example, U.S. Pat. No. 6,255,270 discloses liquid cleaning compositions comprising: an amine oxide detergent; a quaternary disinfectant (quat); an acidifying agent, an effective amount of an electrolytic disinfecting booster and an aqueous carrier, discussing the necessity of achieving the requisite composition pH and amine oxide protonation.

The failure of certain cleaners and disinfectants to break down EPS and LPS defenses and eradicate microorganisms can result from insufficient or ineffective protonation. One problem is that protonation may require maintaining a sufficient difference in pH between the composition donating the protons and that of the surfactant layer in proximity to the microorganisms. In the event the pH of the solution goes below the titration point for the active ingredient, protonation will reduce or cease and no longer be effective in breaking down EPS and LPS defenses or in disrupting the microorganisms therein.

SUMMARY OF THE INVENTION

In accordance with the purpose(s) of the invention, as embodied and broadly described herein, the invention relates to compositions for and methods of cleaning, disinfecting, and sterilizing by contact with hard, soft, and porous surfaces, human and animal skin and tissues, fabrics, carpets, equipment, devices, and other media, such composition comprising a solution or emulsion.

BRIEF DESCRIPTION OF THE FIGURES

The accompanying figures, which are incorporated in and constitute a part of this specification, illustrate several aspects and together with the description serve to explain the principles of the invention.

FIG. 2 shows the hyperprotonation layer at the biofilm.

FIG. 3 is a table showing the antimicrobial performance of the claimed invention with respect to *Escherichia coli, Pseudomonas aeruginosa, Staphylococcus aureus*, and *Proteus vulgaris*.

FIG. 4 is a table showing the antimicrobial performance of the claimed invention with respect to *Listeria monocytogenes*.

DESCRIPTION

Figure 1:
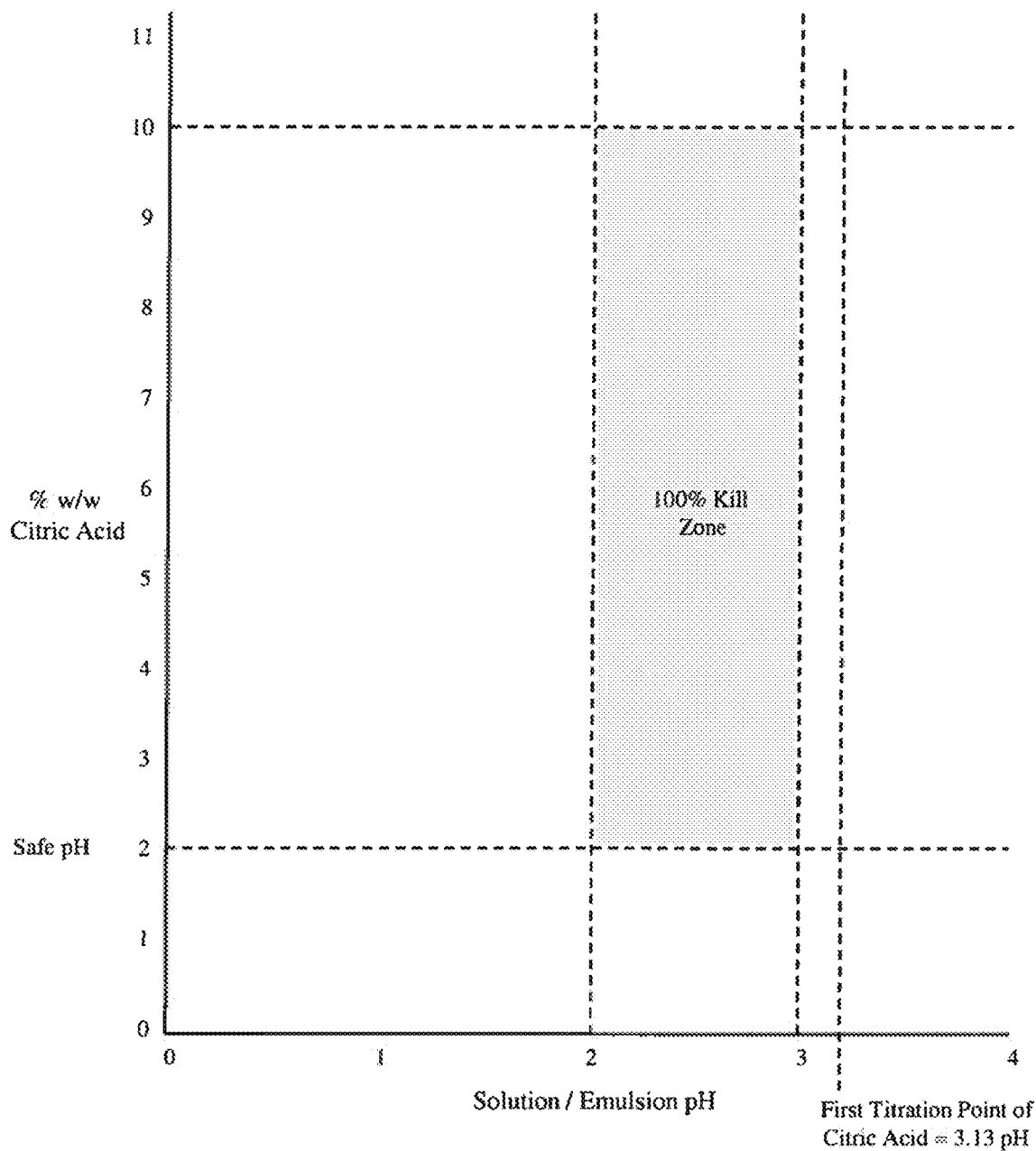
FIG. 1 is a graph showing the hyperprotonation—pH balance and kill zone.

A purpose of this invention is to disclose a newly discovered understanding of the relationship of pH of the cleaning and disinfecting composition, on the one hand, and the dynamic pH of biofilms and microorganisms within biofilms. A surfactant is employed to achieve a wetting layer at the surface of the biofilm. This surface wetting creates the equivalent of a membrane, so that osmotic pressure continues the flow of aqueous solution through the wetting layer. When the raised pH surfactant layer wets the biofilm or microorganism, the result is an increase in pH such that the pH of the surfactant layer exceeds the titration point of the weak acid. By combining a weak acid with such a surfactant layer, in proper pH-titration point balance, the invention maintains continuous and enhanced protonation in the surfactant layer. This causes ongoing creation of hydronium at the surface of the EPS. It is a catalytic process. The surfactant compounds maintaining the pH levels are not consumed in the process. These processes are depicted in FIGS. 1 and 2.

This composition effectively augments or hyper-charges the ongoing impact of the protonation of the weak acid—what is defined for the first time by this application as "hyperprotonation." In hyperprotonation, the pH in the wetting layer remains above the titration point of the acid and thus maintains ongoing production of hydronium, $H_3O$, in a protonation process. By combining a weak acid with such a surfactant layer, in proper pH-titration point balance, the invention maintains enhanced protonation in the surfactant layer. By providing compositions that maintain the pH at the biofilm layer above the first titration point of the weak acid within the composition, the invention enables protonation to continue to occur, such that the EPS and LPS defenses are effectively breached.

Even after EPS and LPS defenses are breached, it also is important to apply effective antimicrobial and biocidal substances to the microbes within. For example, as explained in US Patent Application No. 2013/037430: "Some bacterial pathogens initiate human illnesses from intact or damaged mucosal or skin surfaces. Many of these pathogens are acquired from other persons or animals, from endogenous sources, or from a myriad of environmental sources. Once in humans, pathogens colonize surfaces primarily as biofilms of organisms, defined as thin-films of organisms attached to host tissues, medical devices, and other bacteria through complex networks of polysaccharides, proteins, and nucleic acids. These bacteria may also exist as planktonic (broth) cultures in some host tissue environments, such as the bloodstream and mucosal secretions. Similarly, these potential pathogens may exist as either biofilms or planktonic cultures in a myriad of non-living environments."

US Patent Application No. 2013/037430 discusses compositions of glycerol monolaurate (GML), a naturally occurring glycerol-based compound that has previously been shown to have antimicrobial, antiviral, and anti-inflammatory properties, to be applied as a topical composition in treating microbial infections and illnesses. GML is one chemical within the broader family of glycerol monoester (GME). The class of GME compositions, including GML, have been demonstrated to have potent antibacterial activity against gram-positive cocci, and *Bacillus anthracis*. US Patent Application No. 2013/037430 discloses that: "unlike most antibiotics which have single bacterial targets for antibacterial activities, GML appears to target many bacterial surface signal transduction systems nonspecifically through interaction with plasma membranes. GML also inhibits exotoxin production by gram-positive bacteria at GML concentrations that do not inhibit bacterial growth. These properties are shared with the antibiotic clindamycin, a protein synthesis inhibitor. GML is also virucidal for enveloped viruses, apparently through its ability to interfere with virus fusion with mammalian cells, and through GML's ability to prevent mucosal inflammation required for some viruses to penetrate mucosal surfaces. Studies demonstrate that GML is bactericidal for aerobic and anaerobic gram-positive bacteria in broth and biofilm cultures, GML exhibits greater bactericidal activity than lauric acid, and all forms of GML exhibit antibacterial activity. Additionally, GML is bactericidal for gram-negative bacteria with Lipooligosaccharide (LOS), a low-molecular-weight form of LPS, but GML becomes bactericidal for naturally GML-resistant Enterobacteriaceae by addition of agents that disrupt the LPS layer. Gram-negative anaerobes are susceptible to GML. *Pseudomonas aeruginosa* appear to be the most resistant bacteria tested, but these organisms are killed by GML at pH 5.0-6.0."

US Patent Application No. 2013/037430 described other studies demonstrating that GML and other compounds within the family of GME have potent bactericidal activity against many microorganisms causing human illnesses, including against: gram-positive bacteria, notably gram-positive cocci; anaerobes; pathogenic clostridia; *Candida; Gardnerella vaginalis; Staphylococcus aureus* and *Streptococcus agalactiae*. This includes both aerobes and anaerobes, and gram-positive, gram-negative, and non-gram-staining bacteria.

US Patent Application No. 2013/037430 concluded that: "it is thought that GML inhibits microbial infection through one or more of several mechanisms that include, but are not limited to, direct microbial toxicity; inhibiting entry of the infectious microorganism into the vertebrate cell; inhibiting growth of the microorganism; inhibiting production or activity of virulence factors such as toxins; stabilizing the vertebrate cells; or inhibiting induction of inflammatory or immunostimulatory mediators that otherwise enhance the infectious process."

The class of GME compositions, including GML, have been demonstrated to have potent antibacterial activity, as explained in recent NIH research reports. Schlievert, P, et al. Glycerol Monolaurate Antibacterial Activity in Broth and Biofilm Cultures, Jul. 11, 2012. Importantly, GML's biocidal effect is substantially increased in low pH. However, NIH's recent research believed that "it is unlikely that GML will be used as an antibacterial agent as suspended in aqueous solutions do to its solubility limit of 100 µg/ml in aqueous solutions at 37° C."

It is another purpose of this invention to overcome this believed limitation and to disclose compositions comprising GMEs that are effective in breaching EPS and LPS defenses and eradicating microorganisms in the real world environment. It also is the purpose of this invention to disclose a newly discovered understanding of the relationship of pH and titration dynamics in cleaning, disinfecting and sterilization compositions.

The antimicrobial performance of the claimed invention with respect to *Escherichia coli, Pseudomonas aeruginosa, Staphylococcus aureus*, and *Proteus vulgaris*, whose results are contained in FIG. 3. In all cases, the study organisms resulted in zero positive cultures after 8 minutes of contact with the invention in this embodiment.

The antimicrobial performance of the claimed invention with respect to *Listeria monocytogenes*, whose results are contained in FIG. 4. In all cases, the study organisms resulted in zero positive cultures after 18 minutes of contact with the invention in this embodiment.

Once EPS and LPS defenses are breached, GML, and other related compounds within the category of GME, can be considered to be effective in eradicating microorganisms within biofilm colonies, while being completely safe. GME, including GML, has been determined by the US EPA to be non-toxic; 69 FR 34937. Indeed, GML occurs naturally in honey and human breast milk. All compositions and methods disclosed herein have the further benefit of being classified by the US Food and Drug Administration (FDA) as GRAS, or Generally Regarded As Safe for use on food and food contact surfaces; and the claimed invention herein contains 95% USDA Certified Biobased content and is accepted to the USDA BioPreferred® Program.

INTERPRETATION, INCORPORATION BY REFERENCE

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

As used herein, "non-liquid" means granular, powder or gel formulations which can be diluted with the aqueous carrier liquid described hereinafter to produce a mildly acidic liquid hard surface cleaning composition of the present invention. As used herein, "liquid compositions" mean the mildly acidic, liquid hard surface cleaning and disinfecting compositions of the present invention, or aqueous dilutions thereof. As used herein, all parts, percentages, ppm and ratios are based on weight of the composition and assumes the materials are 100% active unless otherwise specified.

Ranges may be used herein in shorthand, to avoid having to list and describe each value within the range. Any appropriate value within the range can be selected, where appropriate, as the upper value, lower value, or the terminus of the range. As used herein, the singular form of a word includes the plural, and vice versa, unless the context clearly dictates otherwise. Thus, the references "a", "an", and "the" are generally inclusive of the plurals of the respective terms. For example, reference to "a method" or "a fiber" includes a plurality of such "methods", or "fibers." Likewise the terms "include", "including", and "or" should all be construed to be inclusive, unless such a construction is clearly prohibited from the context. Similarly, the term "examples," particularly when followed by a listing of terms, is merely exemplary and illustrative and should not be deemed exclusive or comprehensive. The term "comprising" is intended to include embodiments encompassed by the terms "consisting essentially of" and "consisting of". Similarly, the term "consisting essentially of" is intended to include embodiments encompassed by the term "consisting of." The methods and compositions and other advances disclosed herein are not limited to particular equipment or processes described herein because such equipment or processes may vary. Further, the terminology used herein is for describing particular embodiments only and is not intended to limit the scope of that which is disclosed or claimed. Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law, as if separately set forth herein. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved. Although the foregoing specification and examples fully disclose and enable the present invention, they are not intended to limit the scope of the invention, which is defined by the claims appended hereto. All publications, patents and patent applications are incorporated herein by reference. While in the foregoing specification this invention has been described in relation to certain embodiments thereof, and many details have been set forth for purposes of illustration, it will be apparent to those skilled in the art that the invention is susceptible to additional embodiments and that certain of the details described herein may be varied considerably without departing from the basic principles of the invention.

The Glossary herein sets forth definitions of terms that are used herein which are incorporated herein for ease of reference. However, the definitions are for convenience only and inclusion in the Glossary shall not be construed as providing definitive constructions and definitions of the terms set for thereon.

The use of the terms "a" and "an" and "the" and similar referents in the context of describing the invention are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Embodiments of this invention are described herein, including the best modes known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

GLOSSARY OF DEFINITIONS

Antimicrobial.
Effective in preventing, inhibiting, or arresting the growth or pathogenic effects of a microorganism.
Biocide.
A biocide is a chemical substance or microorganism which can deter, render harmless, or exert a controlling effect on any harmful organism by chemical or biological means. Biocides are commonly used in medicine, agriculture, forestry, and industry. Biocidal substances and products are also employed as anti-fouling agents or disinfectants under other circumstances: chlorine, for example, is used as a short-life biocide in industrial water treatment but as a disinfectant in swimming pools. Many biocides are synthetic, but a class of natural biocides, derived from, e.g., bacteria and plants.
A biocide can be:
a. A pesticide: this includes fungicides, herbicides, insecticides, algicides, molluscicides, miticides and rodenticides.
b. An antimicrobial: this includes germicides, antibiotics, antibacterials, antivirals, antifungals, antiprotozoals, and antiparasites. See also spermicide.
Biofilm.
A biofilm is any group of microorganisms in which cells stick to each other on a surface. These adherent cells are frequently embedded within a self-produced matrix of extracellular polymeric substance (EPS). Biofilm extracellular polymeric substance, which is also referred to as slime (although not everything described as slime is a biofilm), is a polymeric conglomeration generally composed of extracellular DNA, proteins, and polysaccharides. Biofilms may form on living or non-living surfaces and can be prevalent in natural, industrial and hospital settings. The microbial cells growing in a biofilm are physiologically distinct from planktonic cells of the same organism, which, by contrast, are single-cells that may float or swim in a liquid medium.
"Biofilm EPS" refers to an aggregate of microorganisms in which cells adhere to each other on a surface. These adherent cells are frequently embedded within a self-produced matrix of extracellular polymeric substance (EPS), a generally sticky rigid structure of polysaccharides, DNA, and other organic contaminants. A biofilm layer is anchored firmly to a surface and provides a protective environment in which microorganisms grow. Bacteria, viruses, yeasts, molds, and fungi contained in the biofilms can become dormant and therefore reduce their uptake of nutrients and/or antimicrobial agents. Biofilms have been found to be involved in a wide variety of microbial infections in the body, such as urinary tract infections (UTI), catheter infections, middle-ear infections, formation of dental plaque, gingivitis, coating contact lenses, and serious and potentially lethal processes such as endocarditis, infections in cystic fibrosis, and infections of permanent indwelling devices such as joint prostheses and heart valves. Bacterial biofilms may impair cutaneous wound healing and reduce topical antibacterial efficiency in healing or treating infected skin wounds. Biofilms are also present on the removed tissue of 80% of patients undergoing surgery for chronic sinusitis. Biofilms can also be formed on the inert surfaces of implanted devices such as catheters, prosthetic cardiac valves and intrauterine devices.
Microbes form a biofilm in response to many factors, which may include cellular recognition of specific or non-specific attachment sites on a surface, nutritional cues, or in some cases, by exposure of planktonic cells to sub-inhibitory concentrations of antibiotics. When a cell switches to the biofilm mode of growth, it undergoes a phenotypic shift in behavior in which large suites of genes are differentially regulated.
"Biofilm" means an aggregate of microorganisms, usually bacterial, adhered to one another and growing on a surface. The microbial cells in the biofilm typically produce an extracellular three-dimensional matrix growing on a substrate layer known as an extracellular polymeric substance (EPS). Often, this matrix and the density of the aggregate itself significantly increase the antibiotic resistance of the bacteria in the biofilm. Biofilms can be involved in UTIs, ear infections, and dental diseases such as gingivitis, and can also form on the surface of implanted devices including prostheses, catheters, or heart valves.
Disinfectants.
Disinfectants are antimicrobial agents that are applied to non-living objects to destroy microorganisms that are living on the objects. Disinfection does not necessarily kill all microorganisms, especially resistant bacterial spores; it is less effective than sterilization, which is an extreme physical and/or chemical process that kills all types of life. Disinfectants are different from other antimicrobial agents such as antibiotics, which destroy microorganisms within the body, and antiseptics, which destroy microorganisms on living tissue. Disinfectants are also different from biocides—the latter are intended to destroy all forms of life, not just microorganisms. Disinfectants work by destroying the cell wall of microbes or interfering with the metabolism.
Sanitizers are substances that simultaneously clean and disinfect. Disinfectants are frequently used in hospitals, dental surgeries, kitchens, and bathrooms to kill infectious organisms.
Eradication.
Eradication means the complete destruction of a microbe colony, as demonstrated in testing of microbes in real world settings such as biofilms, such that no further microbes are detected in testing following a period of application of at least 18 minutes.

Extracellular Polymeric Substances (EPS).

EPS are high-molecular weight compounds secreted by microorganisms into their environment. EPS establish the functional and structural integrity of biofilms, and are considered the fundamental component that determines the physiochemical properties of a biofilm.

EPS are mostly composed of polysaccharides (exopolysaccharides) and proteins, but include other macromolecules such as DNA, lipids, and humic substances. EPS are the construction material of bacterial settlements and either remain attached to the cell's outer surface, or are secreted into its growth medium. These compounds are important in biofilm formation and cells attachment to surfaces. EPS constitutes 50% to 90% of a biofilm's total organic matter.

Glycerol Monoesters (GME).

Monoesters of C8, C10, and C12 straight-chain fatty acids: glycerol monocaprylate, glycerol monocaprate, and glycerol monolaurate.

Glycerol Monolaurate (GML).

Monolaurin, also known as glycerol monolaurate, glyceryl laurate or 1-.Lauroyl-glycerol, is a monoglyceride. It is the mono-ester formed from glycerol and lauric acid. Monolaurin is most commonly used as a surfactant in cosmetics, such as deodorants. As a food additive it is also used as an emulsifier.

Glycerol monolaurate (GML) is a fatty acid ester of glycerol, derivative of lauric acid, with the chemical formula $C_{15}H_{30}O_4$. GML is also known in the art as glyceryl laurate or monolaurin. GML is found naturally in breast milk and some plants, and is used as a food and cosmetic additive. GML and other glycerides are listed in the Generally Recognized as Safe Substances database by the US Food and Drug Administration. GML and related compounds have been previously disclosed in U.S. patent application Ser. No. 10/579,108 (filed Nov. 10, 2004) and Ser. No. 11/195,239 (filed Aug. 2, 2005), the disclosures of each of which are herein incorporated by reference for all purposes.

Hydronium.

Hydronium is the common name for the aqueous cation $H_3O+$, the type of oxonium ion produced by protonation of water. It is the positive ion present when an Arrhenius acid is dissolved in water, as Arrhenius acid molecules in solution give to a proton (a positive hydrogen ion, H+) to the surrounding water molecules ($H_2O$). It is the presence of hydronium ion relative to hydroxide that determines a solution's pH. The molecules in pure water auto-dissociate into hydronium and hydroxide ions in the following equilibrium:

$$2H_2O = OH- + H_3O+$$

In pure water, there is an equal number of hydroxide and hydronium ions, so it has a neutral pH of 7. A pH value less than 7 indicates an acidic solution, and a pH value more than 7 indicates a basic solution.

Hydrophilic-Lipophilic Balance (HLB).

The hydrophilic-lipophilic balance of a surfactant is a measure of the degree to which it is hydrophilic or lipophilic, determined by calculating values for the different regions of the molecule.

Lipopolysaccharides or LPS.

Lipopolysaccharides (LPS), also known as lipoglycans and endotoxin, are large molecules consisting of a lipid and a polysaccharide composed of O-antigen, outer core and inner core joined by a covalent bond; they are found in the outer membrane of Gram-negative bacteria, and elicit strong immune responses in animals. LPS is the major component of the outer membrane of Gram-negative bacteria, contributing greatly to the structural integrity of the bacteria, and protecting the membrane from certain kinds of chemical attack. LPS also increases the negative charge of the cell membrane and helps stabilize the overall membrane structure. It is of crucial importance to gram-negative bacteria, whose death results if it is mutated or removed. LPS induces a strong response from normal animal immune systems. It has also been implicated in non-pathogenic aspects of bacterial ecology, including surface adhesion, bacteriophage sensitivity, and interactions with predators such as amoebae.

Methicillin-Resistant *Staphylococcus aureus* (MRSA).

Methicillin-resistant *Staphylococcus aureus* (MRSA) is a bacterium responsible for several difficult-to-treat infections in humans. It is also called oxacillin-resistant *Staphylococcus aureus* (ORSA). MRSA is any strain of *Staphylococcus aureus* that has developed, through the process of natural selection, resistance to beta-lactam antibiotics, which include the penicillins (methicillin, dicloxacillin, nafcillin, oxacillin, etc.) and the cephalosporins. Strains unable to resist these antibiotics are classified as methicillin-sensitive *Staphylococcus aureus*, or MSSA. The evolution of such resistance does not cause the organism to be more intrinsically virulent than strains of *S. aureus* that have no antibiotic resistance, but resistance does make MRSA infection more difficult to treat with standard types of antibiotics and thus more dangerous.

MRSA is especially troublesome in hospitals, prisons, and nursing homes, where patients with open wounds, invasive devices, and weakened immune systems are at greater risk of nosocomial infection than the general public. MRSA began as a hospital acquired infection, but has developed limited endemic status and is now sometimes community-acquired. The terms HA-MRSA (healthcare-associated MRSA) and CA-MRSA (community associated MRSA) reflect this distinction.

Microbe or Microorganism.

"Microorganism" is used herein to mean any bacteria, virus, or fungus. In one embodiment, the formulations of the invention are used to prevent, inhibit, or arrest the growth of one or more of the following microorganisms: *Staphylococcus aureus*, *Streptococcus* (e.g., *S. pyogenes*, *S. agalacticae*, or *S. pneumoniae*), *Haemophilus influenzae*, *Pseudomonas aeruginosa*, *Gardnerella vaginalis*, Enterobacteriaceae (e.g., *Escherichia coli*), *Clostridium perfringens*, *Chlamydia trachomatis*, *Candida albicans*, Human Immunodeficiency Virus (HIV), or Herpes Simplex Virus (HSV).

Microorganisms are the cause of many infectious diseases. The organisms involved include pathogenic bacteria, causing diseases such as plague, tuberculosis and anthrax; protozoa, causing diseases such as malaria, sleeping sickness, dysentery and toxoplasmosis; and also fungi causing diseases such as ringworm, candidiasis or histoplasmosis. However, other diseases such as influenza, yellow fever or AIDS are caused by pathogenic viruses, which are not usually classified as living organisms and are not, therefore, microorganisms by the strict definition.

Protonation.

Protonation is a fundamental chemical reaction and is a step in many stoichiometric and catalytic processes. Some ions and molecules can undergo more than one protonation and are labeled polybasic, which is true of many biological macromolecules. Protonation and deprotonation occur in most acid-base reactions; they are the core of most acid-base reaction theories.

Protonations are often rapid, in part because of the high mobility of protons in water. The rate of protonation is related to the acidity of the protonating species, in that protonation by weak acids is slower than protonation of the same base by strong acids. The rates of protonation and deprotonation can be especially slow when protonation induces significant structural changes.

In chemistry, addition of a proton to an atom, molecule, or ion. The proton is the nucleus of the hydrogen atom; the positive hydrogen ion, H+, consists of a single proton. An example of protonation is the formation of the ammonium group $NH_4+$ from ammonia, $NH_3$. Protonation often occurs in the reaction of an acid with a base to form a salt (see acids and bases; salts). Protonation differs from hydrogenation in that during protonation a change in charge of the protonated species occurs, whereas the charge is unaffected during hydrogenation.

Sanitizers.

Sanitizers are substances that simultaneously clean and disinfect.

Sterilization.

Sterilization is a term referring to any process that eliminates (removes) or kills all forms of life, including transmissible agents (such as fungi, bacteria, viruses, spore forms, etc.) present in a specified region, such as a surface, a volume of fluid, medication, or in a compound such as biological culture media. Sterilization can be achieved with one or more of the following: heat, chemicals, irradiation, high pressure, and filtration. Sterilization is distinct from disinfection, sanitization and pasteurization in that sterilization kills or inactivates all forms of life.

For high-risk applications such as medical devices and injections, a sterility assurance level of at least 10-6 is required by the United States Food and Drug Administration (FDA).

Surfactant.

Surfactants are compounds that lower the surface tension (or interfacial tension) between two liquids or between a liquid and a solid. Surfactants may act as detergents, wetting agents, emulsifiers, foaming agents, and dispersants. Examples include: C2-C22 fatty acid salts such as caproic, caprylic, and capric acid salts, lauric and myristic acid salts, and naturally occurring oils (including when saponified) such as palm oil and coconut oil.

Titration.

The titration of a weak acid with a strong base involves the direct transfer of protons from the weak acid to the hydroxide ion.

Titration Curve.

A titration curve is a curve in the plane whose x-coordinate is the volume of titrant added since the beginning of the titration, and whose y-coordinate is the concentration of the analyte at the corresponding stage of the titration (in an acid-base titration, the y-coordinate is usually the pH of the solution).

In an acid-base titration, the titration curve reflects the strength of the corresponding acid and base. For a strong acid and a strong base, the curve will be relatively smooth and very steep near the equivalence point. Because of this, a small change in titrant volume near the equivalence point results in a large pH change and many indicators would be appropriate (for instance litmus, phenolphthalein or bromothymol blue).

If one reagent is a weak acid or base and the other is a strong acid or base, the titration curve is irregular and the pH shifts less with small additions of titrant near the equivalence point. For example, the titration curve for the titration between oxalic acid (a weak acid) and sodium hydroxide (a strong base) is pictured. The equivalence point occurs between pH 8-10, indicating the solution is basic at the equivalence point and an indicator such as phenolphthalein would be appropriate. Titration curves corresponding to weak bases and strong acids are similarly behaved, with the solution being acidic at the equivalence point and indicators such as methyl orange and bromothymol blue being most appropriate.

Weak Acid.

An acid with pH above about 2.0 and below 7.0. All pH values herein are measured in aqueous systems at 25° C. (77° F.). Examples include: citric acid, lactic acid, malic acid, and tartaric acid.

CITATION LIST

Patent Literature

Barger; Bruce, Wierenga; Thomas James. Cleaning and Disinfecting Compositions With Electrolytic Disinfecting Booster, U.S. Pat. No. 6,255,270 (Jul. 3, 2001)

Benson; Keith, Mulcahy; Michael George. Hyperprotonation Cleaning, Disinfection, and Sterilization Compositions and Methods, U.S. Provisional Application No. 62/198,429, (Jul. 29, 2015)

Bueg-Deeb; Maria, Deeb; Thomas. Methods and Compositions for Cleaning and Disinfecting Surfaces, US Patent Application No. 2014/0275267 (Sep. 18, 2014)

Schlievert; Patrick. Compositions for Topical Treatment of Microbial Infections, US Patent Application No. 2013/037430 (Oct. 24, 2013)

Silvester; Raymaond Neville. Amine-acid Thickening Compositions, Patent Application Publication No. EP 0253676 A2 (Jan. 20, 1988).

Urban; Virginia Lee. Hard Surface Cleaning Compositions and Method of Removing Stains, U.S. Pat. No. 6,936,579 (Aug. 30, 2005)

Whiteley; Reginald Keith, Karaman; Marilyn Emily. Biofilm Remover, U.S. Pat. No. 8,012,461 (Sep. 6, 2011)

Non-Patent Literature

REFERENCE

1 Characldis, W. G., Microbial Biofouling Control in Biofilms, Characklis and Marshall, eds., Wiley & Sons, 1990, Costerton, 0.1. W., et al, Annual Review of Microbiology; 1995; 49:711-45.

2 Corcoran, M., et al, Commonly Used Disinfectants Fail to Eradicate *Salmonella enterica* Biofilm from Food Contact Surface Materials, Antimicrobial Resistance and Microbial Ecology Group, Discipline of Bacteriology, National University of Ireland, Galway, Ireland, Dec. 20, 2013.

3 Hidalgo, G., et al., Functional Tomographic Fluorescence Imaging of pH Microenvironments in Microbial Biofilms by Use of Silica Nanoparticle Sensors, Applied and Environmental Microbiology. December, 2009, volume 75, no. 23: 7426-7435.
4 McCutcheon's; Volume 1: Detergents and Emulsifiers, North American Edition, 2014.
5 Ruzin, A., et al., Equivalence of Lauric Acid and Glycerol Monolaurate as Inhibitors of Signal Transmission in *Staphylococcus aureus*, Journal of Bacteriology, May 2000; 182(9): 2668-2671.
6 Schlievert, P., et al., Glycerol Monolaurate Antibacterial Activity in Broth and Biofilm Cultures, Department of Microbiology, University of Iowa, and Experimental and Clinical Pharmacology, University of Minnesota, Jul. 11, 2012.

What is claimed is:

1. An antimicrobial composition consisting of:
distilled water in the amount of 87.00% (w/v);
citric acid in the amount of 10.00% (w/v);
potassium cocoate in the amount of 2.00% (w/v); and
a mixture of:
    polyethylene glycol sorbitan monolaurate in the amount of 0.80% (w/v);
    glycerol monolaurate (GML) in the amount of 0.15% (w/v), wherein the composition is 1,500 µg/ml GML in aqueous solution; and
    sodium stearoyl lactylate in the amount of 0.05% (w/v).

* * * * *